(12) United States Patent
Heise et al.

(10) Patent No.: US 8,035,502 B2
(45) Date of Patent: Oct. 11, 2011

(54) TIRE MODULE WITH PIEZOELECTRIC CONVERTER

(75) Inventors: Andreas Heise, Erzhausen (DE); Stefan Kammann, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 391 days.

(21) Appl. No.: 12/281,074

(22) PCT Filed: Mar. 2, 2007

(86) PCT No.: PCT/EP2007/051977
§ 371 (c)(1),
(2), (4) Date: Dec. 3, 2008

(87) PCT Pub. No.: WO2007/099160
PCT Pub. Date: Sep. 7, 2007

(65) Prior Publication Data
US 2009/0243830 A1    Oct. 1, 2009

(30) Foreign Application Priority Data

Mar. 2, 2006  (DE) .......... 10 2006 009 590
Mar. 2, 2007  (DE) .......... 10 2007 010 779
Mar. 2, 2007  (DE) .......... 10 2007 010 782

(51) Int. Cl.
*B60C 23/00* (2006.01)

(52) U.S. Cl. ........ 340/447; 340/438; 340/442; 310/339; 73/146; 73/146.5

(58) Field of Classification Search ................. 340/447, 340/438, 442, 384.6, 545.4, 870.3; 310/339; 73/146, 146.5, 1.15, 1.16, 1.48, 35.11, 35.13, 73/514.34, 514.35
See application file for complete search history.

(56) References Cited

U.S. PATENT DOCUMENTS

| 4,510,484 | A | 4/1985 | Snyder |
| 5,546,070 | A | 8/1996 | Ellmann et al. |
| 6,438,193 | B1 * | 8/2002 | Ko et al. ........ 377/24.1 |
| 6,798,140 | B2 * | 9/2004 | Reim et al. ........ 315/76 |
| 7,146,853 | B2 | 12/2006 | Fischer et al. |
| 2002/0029626 | A1 * | 3/2002 | Koch et al. ........ 73/120 |
| 2004/0100100 | A1 * | 5/2004 | Wilson ........ 290/1 R |
| 2005/0134444 | A1 * | 6/2005 | Park et al. ........ 340/445 |
| 2006/0028333 | A1 * | 2/2006 | Tyndall ........ 340/447 |
| 2006/0197655 | A1 | 9/2006 | Luo et al. |

FOREIGN PATENT DOCUMENTS

| DE | 3407254 A1 | 10/1984 |
| DE | 43 29 591 C2 | 3/1995 |
| DE | 44 02 136 A1 | 7/1995 |
| DE | 195 22 269 A1 | 1/1997 |
| DE | 299 24 572 U1 | 12/2003 |
| DE | 10 2004 001 250 B4 | 1/2004 |
| DE | 10 2004 031 810 A1 | 7/2004 |
| DE | 103 29 700 A1 | 1/2005 |

(Continued)

*Primary Examiner* — George Bugg
*Assistant Examiner* — Sisay Yacob
(74) *Attorney, Agent, or Firm* — RatnerPrestia

(57) ABSTRACT

A tire module for sensing deflection of a tire and a method of sensing deflection of the tire. The tire module includes a piezoelectric converter that is configured for installation on an inside surface of the tire. The piezoelectric converter includes at least one elastically deformable region that is formed from piezoelectric material. A deflection limiting means is configured to delimit deflection of the elastically deformable region.

25 Claims, 4 Drawing Sheets

FOREIGN PATENT DOCUMENTS

| | | |
|---|---|---|
| DE | 10 2004 002 909 A1 | 8/2005 |
| DE | 10 2004 046 193 A1 | 4/2006 |
| DE | 10 2005 000 996 A1 | 7/2006 |
| DE | 10 2006 003 825 A1 | 9/2006 |
| EP | 1 547 827 A2 | 6/2005 |
| EP | 1 614 552 A1 | 1/2006 |
| WO | WO 2004/030949 A1 | 4/2004 |
| WO | WO 2006/003052 A1 | 1/2006 |
| WO | WO 2006/072539 A2 | 7/2006 |
| WO | WO 2007/000781 A1 | 1/2007 |

* cited by examiner

TIRE MODULE WITH PIEZOELECTRIC CONVERTER

This application is the U.S. National Phase Application of PCT/EP2007/051977, filed Mar. 2, 2007, which claims priority to German Patent Application No. DE102006009590.1, filed Mar. 2, 2006, German Patent Application No. DE102007010782.1, filed Mar. 2, 2007, and German Patent Application No. DE102007010779.1, filed Mar. 2, 2007, the contents of such applications being incorporated by reference herein in their entirety.

BACKGROUND OF THE INVENTION

1. Field of the Invention

The invention relates to a tire module which is installed on the inside of a tire, in particular of a vehicle tire, to a tire monitoring system and to a method for protecting the tire module.

The invention is suitable in particular for acquiring tire state variables with a system which is autonomous in terms of energy.

2. Description of the Related Art

In modern motor vehicles, pneumatic tire pressure-sensing devices are increasingly being used to avoid defects or accidents which are due to an excessively low tire air pressure. In many of these systems, a tire module is arranged respectively on each wheel, in particular in the interior of the tire. A tire module often comprises at least one sensor for sensing at least one tire parameter, in particular the tire pressure, and a transmitter unit and, if appropriate, electronic evaluation system. The energy supply of the electronic components can be provided, for example, by a battery, a microgenerator with a piezoelectric element or a transponder coil.

DE 44 02 136 A1 discloses a system for determining the operating parameters of vehicle tires, in which system a sensor unit, an electronic evaluation system and a piezoelectric element, which supplies the other system components with energy, are arranged on a carrier body. The piezoelectric element has a multi-layer design.

DE 10 2004 046 193 A1 describes a pressure sensor for the wireless measurement of pressure in a tire, and an associated antenna device for transmitting and receiving electromagnetic fields.

DE 10 2006 003 825 A1 discloses a batteryless tire pressure-monitoring system which senses tire parameters via a sensor, wherein the sensor is connected on the input end to an antenna in order to receive a modulated microwave signal and in order to convert part of the modulated microwave signal into a supply voltage via a control circuit.

EP 1 614 552 A1 discloses a bridge-shaped patch with an electromechanical converter for use in a vehicle tire.

DE 10 2004 031 810 A1 specifies a tire monitoring system which generates electrical energy by means of a piezoelectric element which is arranged inside the tire.

DE 43 29 591 C2 discloses a device for monitoring the tire air pressure which receives an electrical pulse via a sensor the degree of deformation of the tire as it passes through the contact area, and an evaluation unit identifies the degree of deformation.

DE 103 29 700 A1 describes a method which identifies the wheel load and the tire air pressure from the rotational speed of the tire and from the length of the contact area and the deformation by means of a differentiating sensor.

DE 10 2004 001 250 B4 discloses a device which determines the lateral positions of the wheels from the deformation of the tire as it passes through the contact area in bends by means of sensor units.

When a microgenerator is used to supply energy to a tire module which is installed in the interior of a tire, it is necessary to ensure that the microgenerator is configured in such a way that it at least withstands the loading during the entire service life of the tire. In this context it is advantageous if the microgenerator forms a compact module with the other components such as, for example, the pieces of equipment.

SUMMARY OF THE INVENTION

On the basis of this prior art, the invention relates to the object of making available a tire module for installation in the interior of a tire, which tire module is sufficiently robust and at the same time lightweight, compact, cost-effective and easy to mount.

This object is achieved, according to aspects of the invention, in that the tire module comprises a number of elastic flexing regions which comprise piezoelectric material or are composed of piezoelectric material, and the tire module comprises a deflection limiting means which protects the elastic flexing region against excessive flexing.

The invention also relates to the use of the tire module in a tire monitoring system, and to a method for protecting a tire module.

The invention relates to the idea that the main load which acts on the tire module and its piezoelectric components is flexing and/or deformation caused by the deformation of the tire as it passes through the contact area, particularly at the bend points as it enters and exits the contact area. In order to increase the service life of the tire module and its components, the acting force should cause flexing, particularly of the piezoelectric component, only to a predefined degree which is below a predefined critical value for the flexing. Since the acting force cannot be limited, or cannot be reliably limited, by simple means, a suitable deflection limiting means for the piezoelectric component is to be provided which limits the flexing.

In order to avoid flexing of the electronic components above a predefined value which can exceed the load bearing capacity, said components are advantageously arranged in an essentially rigid region.

So that the tire module and its elastic flexing region as well as the rigid regions which are assigned to the elastic flexing region can be reliably and permanently attached to the inside of the tire, the use of suitable attachment means and a number of damping means is expediently provided.

So that the loads which act on the tire module as a result of the deformations of the tire as it passes through the contact area can be absorbed mainly using the damping means which are provided, the spring constant of said damping means is greater than that of the elastic flexing region to be protected.

So that the effect on the tire module which occurs when the tire is deformed as it passes through the contact area can be utilized as effectively as possible to generate energy, that is to say to convert mechanical energy into electrical energy, the tire module is advantageously arranged in such a way that the largest possible force can act on the elastic flexing region.

In order to provide a deflection limiting means as the most effective possible protection for the elastic flexing region, the latter is advantageously embodied as a housing which is composed of a number of housing components.

In order to effectively protect the elastic flexing region, the deflection limiting means is expediently arranged in the vicinity thereof.

In order to protect the housing against excessively strong loads such as can occur as a result of the deformation of the tire as it passes through the contact area, the housing is advantageously connected in its end regions to a damping means.

In order to effectively limit the deflection of the elastic flexing region, the flexing of the housing components with respect to one another is advantageously limited by a hard or elastic housing stop.

So that the piezoelectric material can be arranged in the elastic flexing region and a predefined degree of flexing is not exceeded, the elastic flexing region is advantageously embodied as a suitable carrier layer, in particular as a leaf spring.

In order to achieve the highest possible energy yield through the conversion of mechanical energy into electrical energy and to obtain a long service life of the piezoelectric material, the latter is advantageously embodied as a piezoelectric ceramic, in particular lead zirconate titanate, or as a piezoelectric film, in particular composed of polyvinylidene fluoride (PVDF).

In order to utilize the housing stop particularly effectively as a deflection limiting means, the elastic flexing region and the rigid regions assigned to it are advantageously attached to a number of locations, but at least two, in the housing.

So that the supply of the tire module with electrical energy is ensured over the longest possible time period, the tire module expediently comprises a second means for supplying energy and/or storing energy.

In order to permit an unambiguous assignment of the tire module and of its information to a tire and/or wheel of the motor vehicle even over a wireless transmission path, said tire module is advantageously equipped with an RF tag using suitable transponder technology, for example RFID.

So that the information acquired by the tire module can be stored for further uses and so that it can be called independently of time, the tire module is advantageously equipped with a data memory.

So that the information which is acquired by the tire module can be transmitted on a wireless path to a central evaluation unit, the data memory expediently comprises a suitable transceiver unit.

In order to be able to reliably acquire the length of the contact area of a tire and to be able to assign a characteristic variable to said length, the time between the voltage peaks generated in the piezoelectrics at the entry into the contact area and at the exit from the contact area as a result of the deformation of the tire, is measured and evaluated in relation to the rotational speed of the tire.

So that the information which is acquired by the tire module can be reliably evaluated and used to assess driving states and system states, the tire module is advantageously connected into a tire monitoring system with a central evaluation unit by means of suitable transmission paths.

The advantages achieved are, in particular, that the tire module is given a service life which corresponds to that of the tire and therefore does not have to be replaced during its period of use.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Identical parts are provided with the same reference symbols in all of the figures.

Figure 1:
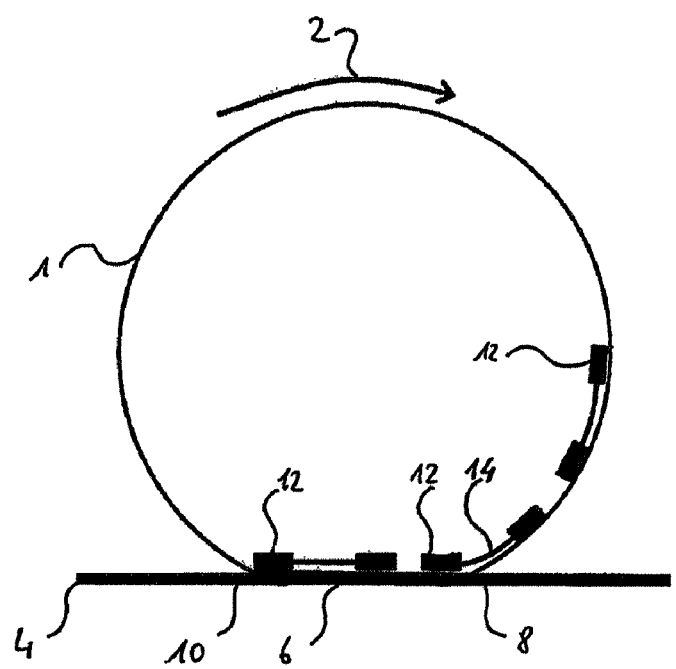
FIG. 1 shows the rolling behavior of a tire in a schematic view.

FIG. 1 shows the rolling behavior of a tire 1 with a rotational direction 2 of a motor vehicle, which behavior can also be transferred, for example, to a motor cycle or a motor scooter, to a utility vehicle, a cycle or aircraft. The rolling behavior is represented here in idealized form on a flat underlying surface 4. A flattened contact area 6 is always produced. The size, that is to say the length and width, the length being measured from the entry 8 into the contact area up to the exit 10 from the contact area, and the shape of the contact area 6 are dependent, inter alia, on tire characteristic data, on the wheel load, the tire pressure, the driving state (longitudinal forces and lateral forces) and the velocity.

The deformation of the tire 1 as it passes through the contact area, specifically the bend 14 at the entry 8 into the contact area and exit 10 from the contact area, can be utilized to acquire energy with a piezoelectric element. It is to be noted in this context that the tire module 12 which comprises the piezoelectric element is protected by a special housing or has in itself a sufficient durability.

The tire module 12 is attached in the tire in such a way that the piezoelectric element is deflected by the rolling movement and therefore converts mechanical energy into electrical energy. Since a piezoceramic is typically brittle and friable, the deflection must be limited by a suitable housing in order to protect the element. All previous approaches to a solution have not taken into account this problem.

Figure 2:
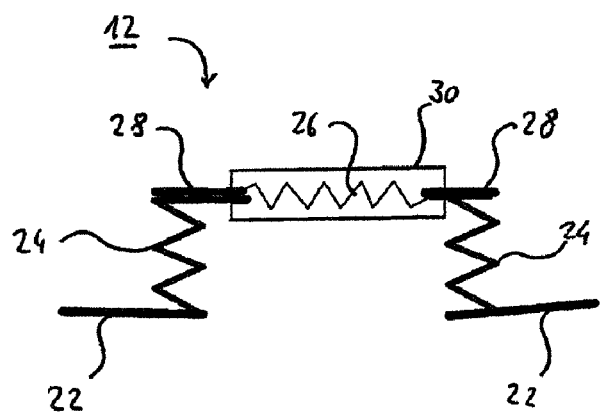
FIG. 2 shows a tire module in a schematic illustration.

FIG. 2 shows an exemplary tire module 12 in which the individual components have been illustrated schematically, in a way which is similar to an equivalent circuit diagram. The module is attached at least two locations to the inside of the tire 1 using suitable attachment means 22, for example using attachment feet or parts of flexible connections which can be composed of a rubber-like material. The tire module 12 comprises two damping regions 24 which usually correspond to housing legs or flexible connections, as well as a region 26 which corresponds to the flexing element, for example a leaf spring, which is composed of piezoelectric material and/or is coated with piezoelectric material. Furthermore, the tire module 12 comprises at least a number of regions 28 which constitute a prolongation of the flexing element 26. The regions 24 and 26 are of elastic design, while the spring constant of the regions 24 is greater than that of the region 26, which means that the damping in the region 24 is greater than in the region 26.

The regions 28, that is to say the prolongations 28 of the flexing element 26, are of essentially rigid design. The tire module 12 furthermore comprises a deflection limiting means 30, for example a stop, for limiting the flexing of the bending element 26.

Figure 3:
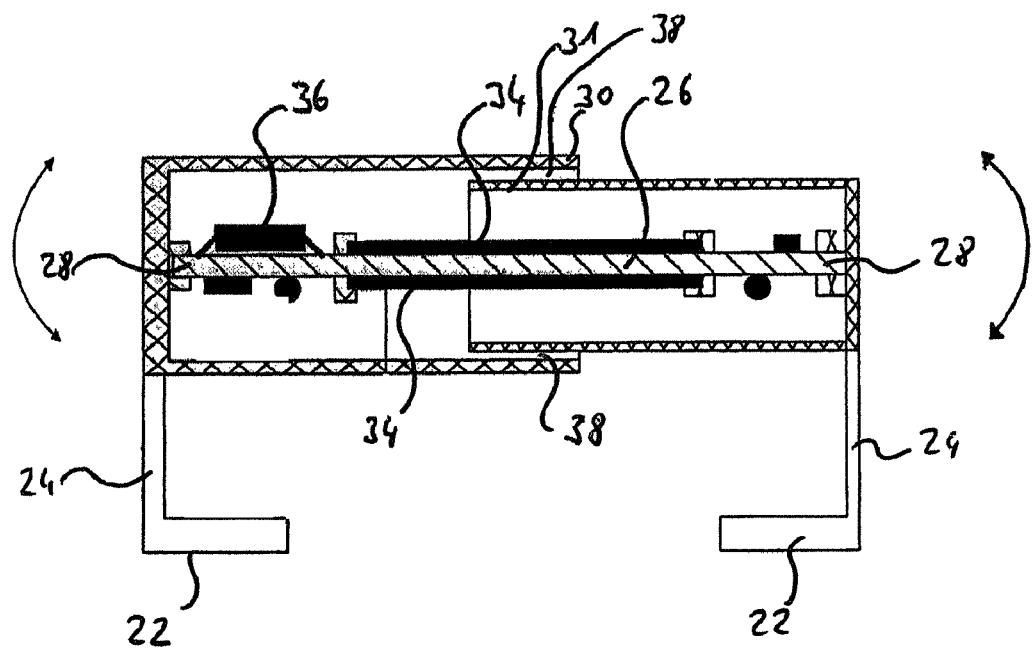
FIG. 3 shows a flexing element in a housing.

FIG. 3 illustrates a conceivable embodiment of the tire module. The elastic housing regions 24, which are embodied as flexible housing legs here, keep excessive deformations away from the regions of the flexing element 26 and of the assigned prolongations 28 in a way which is comparable to a spring. As the contact area is passed through, the flexing element 26, and therefore the piezoelectric converter region 32, are flexed. The said piezoelectric converter region 32 can be embodied as a piezoelectric flexing element 26 or as a comparable, flexurally elastic carrier layer with applied piezoelectric material 34.

The electronic components 36 are applied to the two essentially rigid prolongations 28 of the flexing element 26. The electronic components 36 usually comprise sensors, in particular a number of pressure sensors, an electronic evaluation system, transmitter devices and/or receiver devices for exchanging control signals and data signals, a memory, a second energy source and other components.

In order to delimit the mechanical deflection of the piezoelectric converter region 32 or of the flexing element 26, the housing of the tire module 12 comprises both the elastic housing regions 24 and a deflection limiting means which is respectively assigned to a housing unit 30 and 31 and which is embodied, for example, as a housing stop. In this representation, the deflection limiting means is implemented by two housing components 30 and 31 which are joined one in the other, wherein the diameter of the housing component 31 is smaller than that of the housing component 30. In the event of excessive flexing in the direction specified by the arrows, the housing components 30 and 31 abut one another in the regions 38 on both sides, which prevents further flexing and therefore protects the piezoelectric converter region 32 or the flexing element 26 with the piezoceramic material 34 from destruction. The circuit carrier 26 acts here in the manner of a hinge in the piezoelectric converter region 32.

Figure 4:
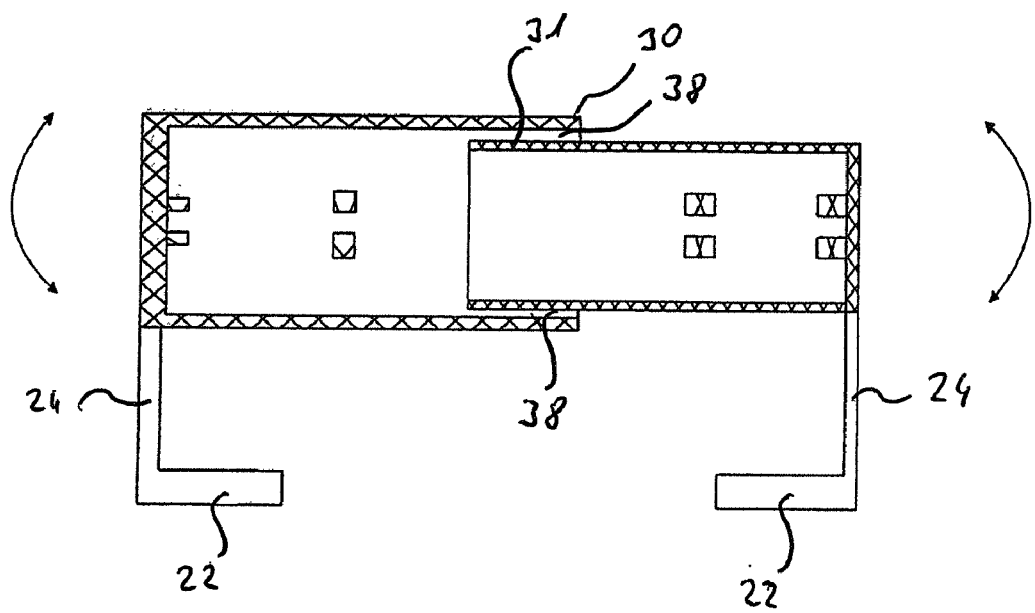
FIG. 4 shows the abovementioned housing without the flexing element.

FIG. 4 shows the housing example from FIG. 3, but without the circuit carrier which is embodied as a flexing element 26 and which has piezoelectric material 34 and the electronic components 36.

Figure 5:
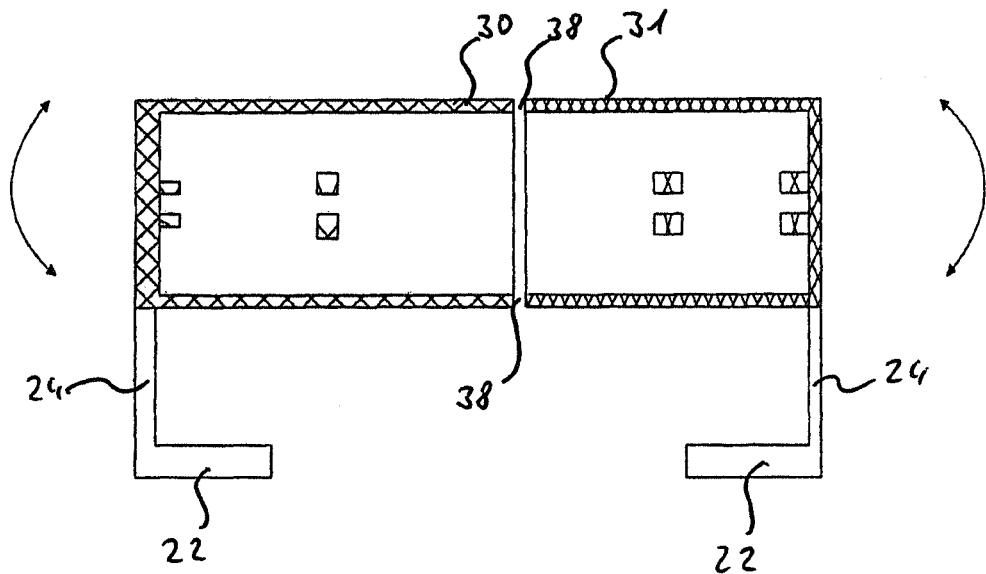
FIG. 5 shows a housing in another embodiment.

FIG. 5 shows a further example of the conceivable configuration of a housing. In contrast to the illustrations in FIG. 3 and FIG. 4, the deflection limitation which is necessary to protect the piezoelectric material 34 is implemented by virtue of the fact that the two housing components 30 and 31 have the same diameter and are arranged at a predefined distance from one another. When there is excessive flexing in the direction specified by the arrows, the housing components 30 and 31 abut one another at the stop points 38, which prevents further flexing of the carrier layer 26 in the piezoelectric material 34.

Figure 6:
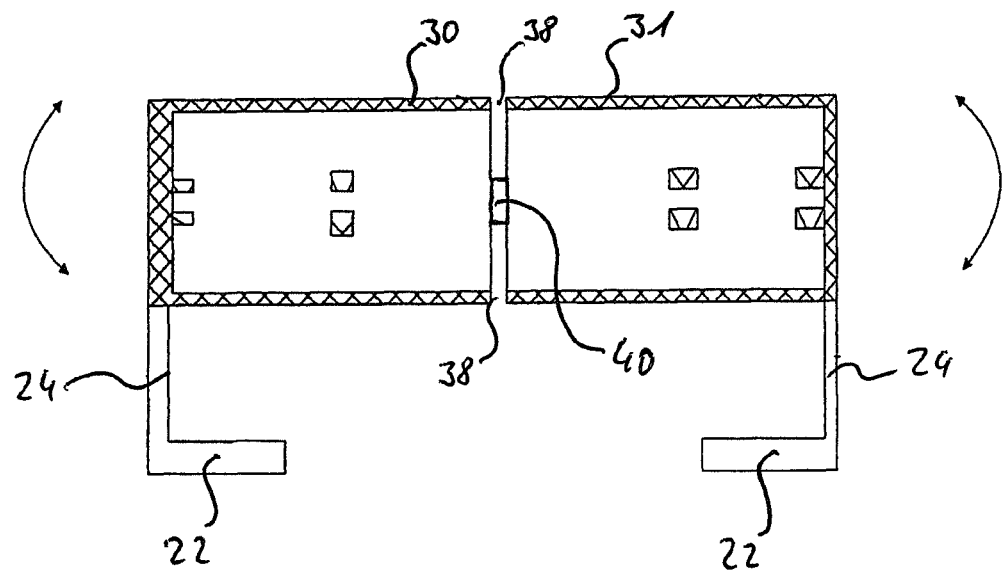
FIG. 6 shows the abovementioned housing with a connecting element.

FIG. 6 shows a further housing example which is similar to that shown in FIG. 5. Here, the hinge function of the housing is assisted additionally by the housing region 40 which is of flexible design and which constitutes a further stop in addition to the stop points 38 between the housing components 30 and 31 during the deflection. In a way which is analogous to the embodiment illustrated in FIG. 3, the piezoelectric flexing element 26, which is embodied as a flexurally elastic carrier layer with the applied piezoelectric material 34, and therefore the piezoelectric converter region 32, run through the flexible housing region 40. The connection between the two housing components 30 and 31 acts, on the one hand, as a hinge and can, on the other hand, absorb longitudinal forces. Further protection of the piezoelectric material 34 against destruction is therefore implemented. In order to ensure the best possible application of force to the piezoelectric material 34, the flexible housing region or web 40 should be located as close as possible to the carrier layer 26.

Figure 7:
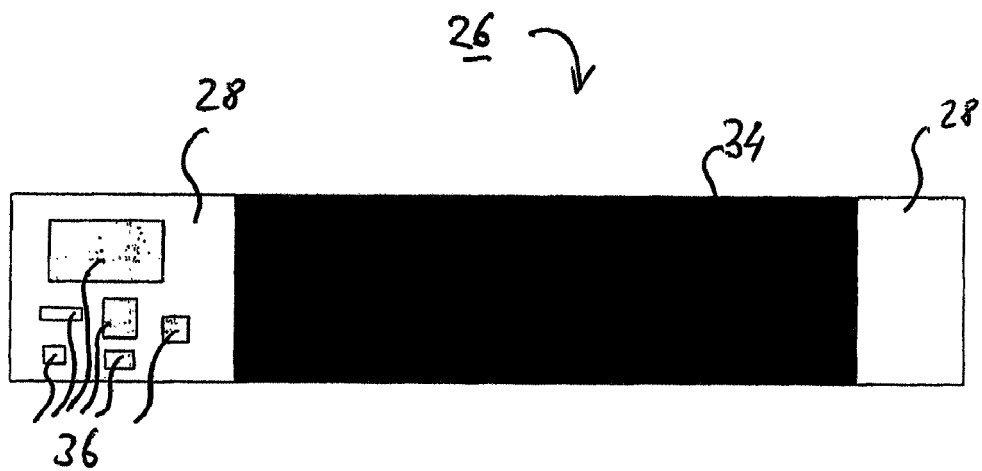
FIG. 7 shows a single-component flexurally elastic carrier layer.
Figure 8:
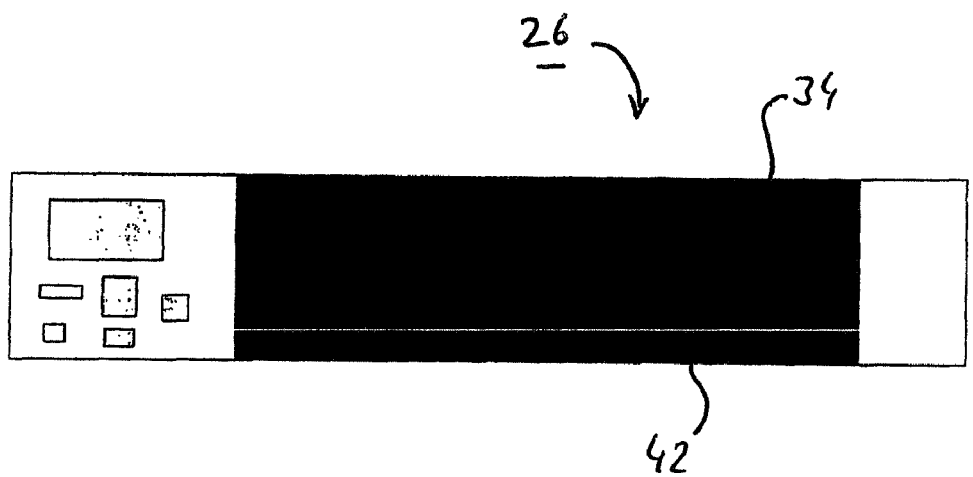
FIG. 8 shows a two-component flexurally elastic carrier layer.

FIGS. 7 and 8 show two embodiments of an exemplary flexurally elastic carrier layer 26 to be incorporated into the housing shown in FIGS. 3 to 6, which are composed of the respective housing components 30 and 31. This carrier layer 26 is embodied here directly as a circuit carrier, for example as a printed circuit board. The electronic components 36 are arranged in a rigid region 28, that is to say in a prolongation of the flexing element 26, of the circuit carrier. The latter serves also as a basis for the electronic circuit. The second rigid region 28 can also optionally be used for this.

The regions 28 correspond to the securing regions for attaching the circuit carrier 26 in one of the housing components 30 or 31. The piezoelectric converter region 32 is arranged in the central region of the circuit carrier 26. Here, the piezoelectric material 34 is arranged on one side or on both sides, for example.

In FIG. 8, the region with piezoelectric material 34 is divided into two separate areas 34 and 42. It is therefore possible, for example, for the relatively small region 42 to serve as a sensor, typically for measuring the contact area, while the relatively large region of the piezoelectric surface 34 can be used to acquire energy in an embodiment as a microgenerator.

As well as the abovementioned microgenerator, a tire module 12 of the abovementioned design can also use a second energy source in order to be able to maintain a functional capability in the stationary state or be able to store data. This energy source can be embodied, for example, as a battery or a low frequency source, usually from a frequency range around 125 kHz. This provides the possibility of supplying energy to the tire module 12 both while traveling and in the stationary state, such as, inter alia, during production. During travel, the energy is supplied using the abovementioned microgenerator, and in the stationary state the energy can be supplied via a low frequency field. The LF field can also transmit data to the tire module as well as supplying energy.

A combination with RFID (Radio Frequency Identifier) is also possible. In this context, the known RFID technology is applied in combination with the tire module 12. By means of RFID it is possible to read data out of a memory and/or write it into a memory. This memory is identical to the data memory which the tire module 12 uses in the driving mode, for example in the microgenerator mode. By means of RFID it is therefore possible to write data into the tire and read data out of the tire. This transmission of data can be used both during production of the tire or of the vehicle and during operation, for logistics or for diagnostics when the vehicle is serviced. Both RFID and the unit which controls the module use the same memory here. An advantage here is that the RFID technology does not require any external voltage supply. This predetermines that this technology will be combined with a microgenerator-fed tire module 12 which functions only during the travel mode.

The microgenerator which supplies the tire module 12 entirely or partially with voltage can also be used to detect the length of the contact area, that is to say the distance between the entry 8 into the contact area and the exit 10 from the contact area and/or to detect the ratio between the time of the passage through the contact area and the total rotation time of the tire 1, in which case the microgenerator is used as a signal transmitter for detection of the contact area. The microgenerator, which serves also as a sensor here, can utilize radial or tangential changes in acceleration, a deformation of the tire 1 or a combination of both in this context. A microgenerator which is based on a piezoelectric converter, as described above, is preferred.

One possibility is to measure the deformation or expansion of the inner liner of the tire 1, specifically the bend 14 at the entry 8 into the contact area or exit 10 from the contact area, and to determine therefrom the time required for the passage 6 through the contact area and the revolution time of the tire 1. This may also be done using a piezoelectric material 34 which is arranged at a region in the tire 1 which is deformed during the passage 6 through the contact area. Since the tire 1 is deformed at the entry 8 into the contact area and exit 10 from the contact area, charge separation occurs in the piezoelectric material 34, which separation can be tapped as an electrical voltage. The times between these voltage peaks can be identified. The contact area time and the rotation time of the tire 1 are obtained from the time intervals.

The information and data, for example contact area time and total rotation time, described above are then transmitted as a component of the transmission protocol from the tire module 12 to the vehicle electronics, for example a central unit of a tire monitoring system in the motor vehicle. The data can be processed either in the tire module 12 or in the vehicle electronics here.

The tire module 12 identifies an indicator for the length of the contact area or the ratio of the length of the contact area to the overall circumference of a tire. In this context, it is possible, for example, to measure a quotient of the contact area time and rotation time. The indicator can be transmitted from the tire module 12 to an evaluation unit.

The identified ratio of the contact area time to the rotation time can be used for one or more of the following system tasks, if appropriate the information relating to the contact area time/length of the contact area can be supplemented by or combined with information relating to the tire pressure, which is usually determined with a pressure sensor which is integrated, in particular, into the tire module 12:

1. Assignment of the tire modules to the individual positions (autolocation) by means of "dynamic axle load distribution". Wheel loads corresponding to the vehicle movement dynamics occur and correspondingly different lengths of contact area also occur, depending on the travel situation. In the case of a right-handed bend, there is, for example, dynamic loading of the left-hand wheels (those on the outside of the bend). The contact area on the left-hand side of the bend therefore becomes longer and the contact area on the right-hand side of the bend becomes shorter. If, for example, braking occurs, the contact area at the front becomes larger. Therefore, when traveling through a bend or when acceleration or braking occurs, different lengths of contact area occur and these can be detected and utilized.
2. Load-dependent pressure warning becomes possible (as a result of more weight the length of the contact area becomes greater, and this means that more pressure is necessary in the tire). Tire manufacturers recommend that different air pressures be set depending on the load. Usually the subdivision was into two or three stages (empty, partially laden, fully laden) in the past. Here, it is possible to apply an intelligent model which, for example, additionally takes into account the distance traveled or the velocity of the vehicle (a pressure warning is given in the case of a high load and when the air pressure is insufficient for it, for example only after a specific distance traveled or starting from a certain velocity).
3. Rolling movements can be detected and prevented by communication with the ESP control unit. If a vehicle rolls, the dynamic wheel loads change. This can be detected by a measurement of the length of the contact area and used for other systems.
4. The individual wheel loads can be detected and used by other systems of the vehicle. If the properties of a tire are known, the wheel load can in principle be determined using the length of the contact area and the tire pressure. The wheel loads can be used, for example, for optimizing the brake system (EBD—Electronic Brake Distribution). Furthermore, the spring/damper effect of modern bogeys can be adjusted. When the wheel loads are known, the bogey can be adapted to the conditions, which signifies more comfort and safety for the driver. Likewise, the steering can react to the individual wheel loads (or the load state of the vehicle). It is therefore possible to improve the comfort and handling of laden vehicles.
5. Uneven underlying surfaces can be detected and used by other systems of the vehicle (for example bogeys or brakes).
6. Early detection of aquaplaning (or travel on slush etc.) becomes possible (aquaplaning of a wheel is detected). Vehicle systems can react to this and carry out an open-loop/closed-loop control.
7. It is possible to detect wheel loads since the length of the contact area corresponds directly to the wheel load. The detection of the wheel load can be used, for example, for automatic control of the beam width, as a result of which sensors which have been necessary for this hitherto can then be dispensed with.
8. Use of the contact-area length signal for early detection and avoidance of rollover (Roll-Over Protection), since imminent lifting off of one or more wheels is detected.
9. Detection of lifting off (or imminent lifting off) of a vehicle wheel from the underlying surface.
10. Redundancy of the air pressure sensor. Hitherto, it has not been possible to check the plausibility of the pressure value. If the length of the contact area is also available as a second item of information, a pressure sensor which is "hanging in midair" or a pressure sensor which acquires an entirely incorrect value, can be detected.

The invention claimed is:

1. A tire module for sensing deflection of a tire comprising:
a piezoelectric converter configured for installation on an inside surface of a tire;
the piezoelectric converter including at least one elastically deformable region formed from piezoelectric material;
a deflection limiting means configured to delimit deflection of the elastically deformable region;
attachment means for attaching the elastically deformable region to the inside of the tire; and
an elastic damping means connected between the attachment means and the elastically deformable region.

2. The tire module as claimed in claim 1, further comprising at least one rigid region connected to or extending from the at least one elastically deformable region, and electronic components arranged on the at least one rigid region.

3. The tire module as claimed in claim 2, wherein the at least one rigid region is between the attachment means and the elastically deformable region.

4. The tire module as claimed in claim 3,
wherein a spring constant of the elastic damping means is greater than a spring constant of the elastically deformable region.

5. The tire module as claimed in claim 1,
wherein said tire module is arranged in the tire such that a force is transmitted to the elastically deformable region of the tire module as a result of the deformation of the tire.

6. The tire module as claimed in claim 1,
wherein the deflection limiting means is a housing composed of a plurality of housing components.

7. The tire module as claimed in claim 6,
wherein the housing includes at least two components that are coupled to and arranged to substantially enclose the elastically deformable region, wherein each of the housing components is connected to an elastic damping means.

8. The tire module as claimed in claim 7, wherein the housing includes a stop for limiting the deflection of the elastically deformable region.

9. The tire module as claimed in claim 1, wherein the deflection limiting means is positioned in the vicinity of the elastically deformable region.

10. The tire module as claimed in claim 1, wherein the elastically deformable region is a carrier layer on which piezoelectric material is applied to one or two sides of the carrier layer.

11. The tire module as claimed in claim 10, wherein the carrier layer is a leaf spring.

12. The tire module as claimed in claim 10, further comprising a plurality of carrier layers.

13. The tire module as claimed in claim 1, wherein the piezoelectric material is a piezoelectric ceramic or a piezoelectric film.

14. The tire module of claim 13 wherein the piezoelectric ceramic is lead zirconate titanate (PZT) and the piezoelectric film is polyvinylidene fluoride (PVDF).

15. The tire module as claimed in claim 1, further comprising a means for supplying energy.

16. The tire module as claimed in claim 15, wherein the means for supplying energy is a battery, a transponder using an electromagnetic field, or a combination thereof.

17. The tire module as claimed in claim 1, wherein said tire module includes an RF tag.

18. The tire module as claimed in claim 1, wherein said tire module includes a data memory.

19. The tire module as claimed in claim 18, wherein the data memory comprises a transceiver unit for wireless transmission of data.

20. The tire module as claimed in claim 1, wherein said tire module is configured to determine a contact area length of the tire.

21. A tire monitoring system comprising:
a plurality of tire modules each being configured for sensing deflection of a respective tire;
each tire module including a piezoelectric converter configured for installation on an inside surface of a tire, the piezoelectric converter including at least one elastically deformable region formed from piezoelectric material, a deflection limiting means configured for delimiting deflection of the elastically deformable region, attachment means for attaching the elastically deformable region to the inside of the tire, and an elastic damping means connected between the attachment means and the elastically deformable region or the rigid region; and
a central unit configured for receiving signals from each tire module.

22. The tire monitoring system as claimed in claim 21, wherein the central unit is configured to receive signals from each tire module by either control lines or wireless transmission.

23. The tire monitoring system as claimed in claim 21, wherein the central unit is configured to perform one or more of the following operations:
determine the angular position of the tires;
alert an end user to low tire pressure;
detect motion of the tires;
transmit data to other vehicle control systems;
detect tire lift-off and vehicle rollover;
or any combination thereof.

24. The tire module as claimed in claim 1, wherein the tire is a vehicle tire.

25. A method of sensing deflection of a tire comprising the steps of:
deforming at least one elastically deformable region of a tire module that is coupled to or composed of a piezoelectric material, wherein the tire module is positioned on a surface of the tire and the at least one elastically deformable region is supported by spaced apart attachment means with the deforming occurring based on relative displacement between the attachment means;
delimiting deformation of the at least one of the elastically deformable region; and
generating an electrical potential within the piezoelectric material in response to the deforming step.

* * * * *